United States Patent
Lumbab

(10) Patent No.: US 8,115,498 B1
(45) Date of Patent: Feb. 14, 2012

(54) PROXIMITY SENSOR INTERFACE DEVICE AND METHOD FOR ITS USE

(75) Inventor: Alex C. Lumbab, Bothell, WA (US)

(73) Assignee: The Boeing Company, Chicago, IL (US)

( * ) Notice: Subject to any disclaimer, the term of this patent is extended or adjusted under 35 U.S.C. 154(b) by 369 days.

(21) Appl. No.: 12/572,630

(22) Filed: Oct. 2, 2009

(51) Int. Cl.
*G01R 27/26* (2006.01)
(52) U.S. Cl. ............ 324/677; 324/661; 324/662
(58) Field of Classification Search ............ 324/677
See application file for complete search history.

(56) References Cited

U.S. PATENT DOCUMENTS

| | | | |
|---|---|---|---|
| 5,410,488 A | 4/1995 | Andersen, III | |
| 5,831,597 A * | 11/1998 | West et al. | 345/163 |
| 7,358,720 B1 | 4/2008 | Maier | |
| 7,586,303 B2 | 9/2009 | Kirchdoerffer et al. | |
| 2006/0250143 A1 * | 11/2006 | Moon et al. | 324/674 |
| 2008/0305709 A1 * | 12/2008 | Chan | 446/297 |

* cited by examiner

Primary Examiner — Thomas Valone
(74) Attorney, Agent, or Firm — Armstrong Teasdale LLP

(57) ABSTRACT

A device for determining a position of a proximity sensor with respect to a target mechanism is described. The device includes a frequency generator, a processing device, and an RC circuit. An output of the frequency generator is operable for application to a proximity sensor whose position relative to a target is to be verified. The RC circuit is chargeable via voltage applied to the proximity sensor by the frequency generator. The processing device is programmed to turn off the output of the frequency generator after a prescribed amount of time, and further programmed to measure a discharge time of the RC circuit after turning off the output of the frequency generator. The discharge time of the RC circuit is directly proportional to a perceived gap between a face of the proximity sensor and the target mechanism.

19 Claims, 6 Drawing Sheets the field of the invention relates generally to the measure-
PROXIMITY SENSOR INTERFACE DEVICE AND METHOD FOR ITS USE

BACKGROUND

The field of the invention relates generally to the measurement of air gaps between proximity sensors and related metal targets, and more specifically to a proximity sensor interface device for verifying the correct air gap between a proximity sensor and a metal target.

In one application, proximity sensors for pressurized access doors are difficult to mechanically test due to limited space constraints both within the small confines of the sensor installation itself and the general area where the access door is located. Proper rigging (mechanical placement) of the proximity sensors is critical to provide a true indication of the access door's latched (or unlatched) condition. When the proximity sensors are not properly located in such an application, one result may be a false indication during a flight. While such nuisance indications are not necessarily a safety-of-flight issue, they may be cause for unnecessary aborted flights.

Currently, there are three solutions that are utilized to ensure proper mechanical placement of proximity sensors in the access door application. In the first solution, the access doors are mechanically rigged either at pre-integration or final assembly and delivery mechanically using modified bent-up feeler gauges. However, limited space constraints make it virtually impossible to mechanically rig the proximity sensors. More specifically, due to the relatively tight space inside the sensor installation, it is difficult to get hard feeler gauges into the space to successfully measure the gap between the proximity sensor and its target mechanism. Moreover, the modified bent-up gauges currently utilized are not accurate and difficult to insert into the air gap. Clay or metrological rubber is also difficult to apply because the access door sensor application is a sliding joint. As a result, capturing the true air gap in a modeling medium is also not very accurate.

The second solution is an internal proximity sensor rigging aid, which is a tool available on maintenance laptop computers which provides the capability to electronically rig the proximity sensors. This device and program utilize the aircraft's on-board proximity sensor data concentrator and general processing modules to drive/interrogate the sensors in exactly the same way as in actual ground operation/flight. However, this solution assumes that power is available on the aircraft. In most access door rigging manufacturing sequences, the doors are installed and the proximity sensors are rigged at pre-integration sites. As such, systems and aircraft power may not necessarily be available.

Another device is known that electronically rigs the proximity sensors. However, this device is a relatively large unit and so placement of the device conveniently within the confined aircraft space to test the proximity sensor mechanical is questionable. More specifically, this proximity sensor device requires a reference inductor in order to determine the air gap between a proximity sensor face and an associated target mechanism.

BRIEF DESCRIPTION

In one aspect, a device for determining a position of a proximity sensor with respect to a target mechanism is provided. The device includes a frequency generator, a processing device, and an RC circuit. An output of the frequency generator is operable for application to a proximity sensor whose position relative to a target mechanism is to be verified. The RC circuit is chargeable via voltage applied to the proximity sensor by the frequency generator. The processing device is programmed to turn off the output of the frequency generator after a prescribed amount of time, and further programmed to measure a discharge time of the RC circuit after turning off the output of the frequency generator, as the discharge time of the RC circuit is directly proportional to a perceived gap between a face of the proximity sensor and the target mechanism.

In another aspect, a method for determining a position of a proximity sensor with respect to a target mechanism is provided. The method includes applying a signal of known frequency to the proximity sensor, charging an RC circuit with the signal passing through the proximity sensor, removing the signal of known frequency from the proximity sensor after a prescribed time period, and measuring the discharge time of the RC circuit, the discharge time being directly proportional to a perceived gap between a sensor face of the proximity sensor and the target mechanism.

In still another embodiment, a unit for determining a position of a proximity sensor with respect to a target mechanism is provided. The unit includes a processing device programmed to output a signal of known frequency for a prescribed period of time, the signal for application to the proximity sensor, and an RC circuit operatively coupled to the proximity sensor and the processing device. The RC circuit is charged by the signal of known frequency passing through the proximity sensor, the processing device is programmed to measure a discharge time of the RC circuit after the signal of known frequency is removed from the proximity sensor, and the discharge time is directly proportional to a perceived gap between a sensor face of the proximity sensor and the target mechanism.

The features, functions, and advantages that have been discussed can be achieved independently in various embodiments of the present invention or may be combined in yet other embodiments further details of which can be seen with reference to the following description and drawings.

DETAILED DESCRIPTION

Embodiments described herein relate to a proximity sensor interface device that is a portable, hand-held, self-powered, electronic device capable of interfacing, for example, with the proximity sensors deployed on an air vehicle. More specifically, the described proximity sensor interface device is a device that electronically measures a gap perceived by a proximity sensor, the perceived gap being between the proximity sensor and its corresponding metal target. The gap between a proximity sensor and its corresponding target is sometimes referred to as an air gap.

As further described, the proximity sensor interface device is a portable, hand-held, self-powered unit that can both drive and interrogate a proximity sensor. In one embodiment, which is further described below, the device utilizes a simple frequency generator and an RC circuit to provide measurement of the air gap. The measure of time for the RC circuit to decay after it has been charged via the driven proximity sensor, generally an inductive proximity sensor, can be converted into perceived air gap.

Figure 1:
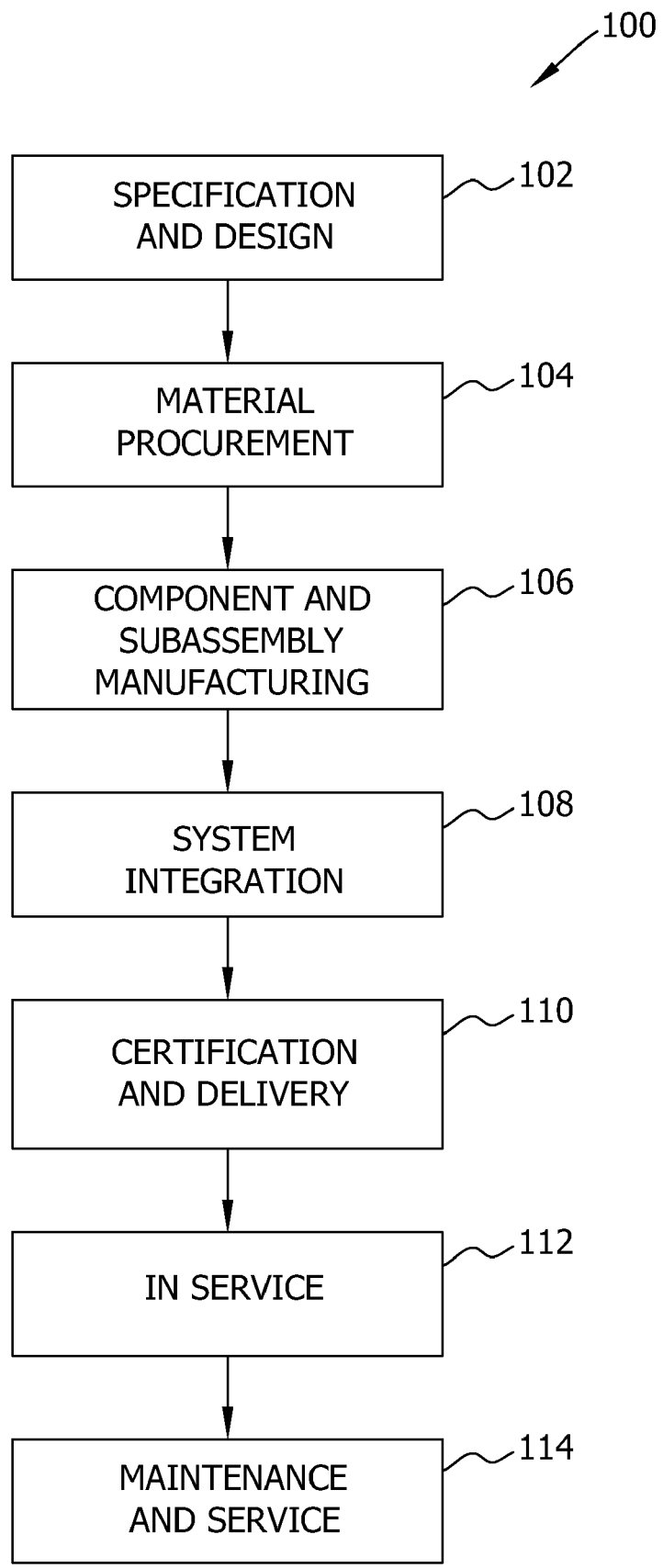
FIG. 1 is a flow diagram of an aircraft production and service methodology.
Figure 2:
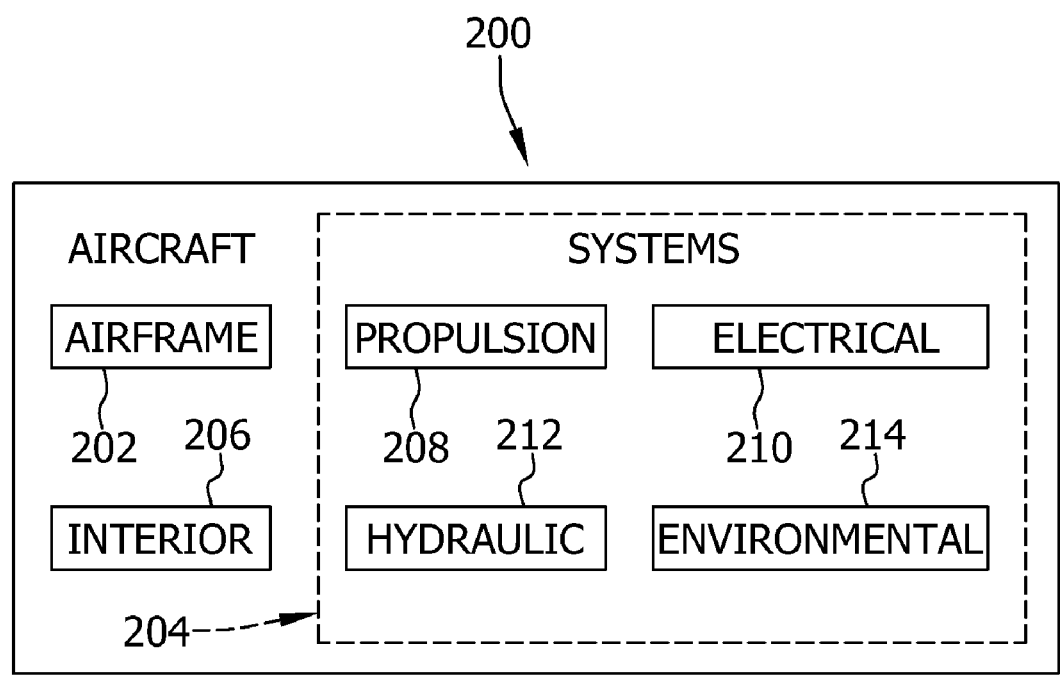
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of vendors, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example and many of these are known to incorporate proximity sensors. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. In addition, one or more apparatus embodiments, method embodiments, or a combination thereof may be utilized during certification and delivery 110 for example, but without limitation, qualification testing of said components or subassemblies that employ proximity sensors in order to satisfy certification testing requirements. Similarly, one or more of apparatus embodiments, method embodiments, or a combination thereof may be utilized while aircraft 200 is in service, for example, without limitation, during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
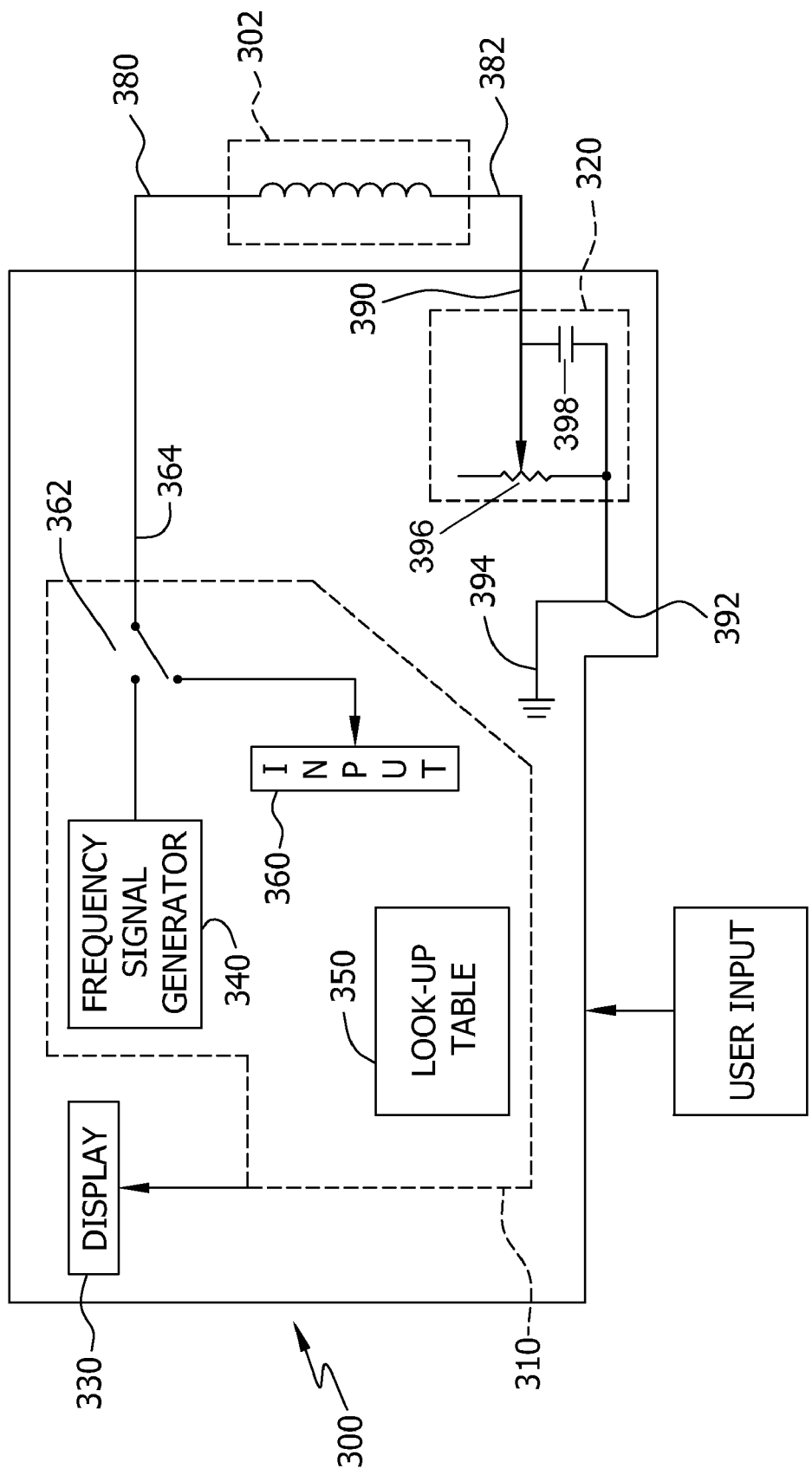
FIG. 3 is a schematic diagram of a proximity sensor interface device.

FIG. 3 is a schematic diagram that illustrates one embodiment of a proximity sensor interface device 300 that is interconnected to a proximity sensor 302. The proximity sensor interface device 300 includes a processing device 310 which accepts user input and an RC circuit 320. The processing device is configured to drive a display 330. In the illustrated embodiment, the processing device 310 includes a frequency signal generator 340, a look up table 350, and at least one input 360 that interfaces through an internal switch 362 with a first lead 380 of the proximity sensor 302 under test and the frequency generator 340. A second lead 382 of the proximity sensor 302 under test is connected to a first lead 390 of the RC circuit 320. A second lead 392 of the RC circuit 320 is connected to ground 394.

Switch 362, in one embodiment, is an internal switch controlled by the processing device 310. In the illustrated embodiment, lead 380 is actually connected to a single pin 364 of the processing device 310. As illustrated by the depiction of switch 362, pin 364 can change state between an input function, routing a signal to input 360, and an output function, routing a signal from frequency signal generator 340 to lead 380 of proximity sensor 302. In other words, pin 364 is in an output state, it is supplying the frequency signal, and when it is in an input state, it allows processing device 310 to measure the RC decay time through input 360.

In the illustrated embodiment, the resistor 396 and the capacitor 398 of the RC circuit 320 are in parallel, and in the illustrated embodiment the resistor 396 is a variable resistor that is electrically connected so that parameters of the RC circuit 320 can be varied by changing the resistance associated with the RC circuit 320.

As apparent from the schematic, proximity sensor interface device 300 is a portable, hand-held, self-powered unit that can both drive and interrogate the proximity sensor 302. The frequency signal generator 340 drives the proximity sensor 302 and subsequently charges the RC circuit 320. As the RC circuit 320 is discharged, its drop in voltage is fed through switch 362 and into the input 360 of processing device 310 for analysis. As stated above, proximity sensor interface device 300 simplifies the electronics into a simple frequency generator and RC circuit to provide measurement of the air gap between the proximity sensor and its target mechanism. More specifically, and in one embodiment, the measurement of time for the RC circuit 320 to decay after it has been charged via the driven proximity sensor 320 can be converted into a perceived air gap.

In one embodiment, the proximity sensor 302 is driven by a PWM frequency generator (frequency generator 340) that inputs a signal of known frequency into the inductive proximity sensor 302. At the same time, RC circuit 320 being charged by the output voltage imparted via the proximity sensor 302. Because the embodiment of proximity sensor 302 is inductive, it generates a magnetic field forward of the sensor face as the sensor 302 is being excited by the frequency signal. As programmed into processing device 310, the signal of known frequency is active for a prescribed amount of time and then is turned off. Immediately afterwards, the processing device, 310, such as a microcontroller, switches to input mode, allowing discharge of the RC circuit 320 back into the processing device 310 for analysis.

The processing device 310 is programmed to measure the amount of time it takes the RC circuit 320 to discharge, for example, in time units. The time measurement device may comprise of a high speed counter or equivalent circuitry with resolution sufficient to properly capture the RC circuit discharge time as the RC circuit decays from its charged voltage state to a pre-determined threshold voltage close to or at zero volts. The amount of charge, and therefore its discharge time, is directly proportional to the perceived gap between the sensor face of proximity sensor 320 and the associated target mechanism. In one embodiment, the processing device is configured with a look up table that describes the relationship between a discharge time of the RC circuit 320 and the gap between the face of the proximity sensor 302 and the target mechanism. Because the target mechanism interferes with the magnetic field in a uniform manner, its distance relative to the sensor face will change the level of charge of the RC circuit 320, and thus a discharge time of the RC circuit 320. In one embodiment, the processing device 310 loops this process many times per second and so the output of the proximity sensor interface device 300 will continuously provide an indication of output discharge times and provide live data of the gap between the proximity sensor 302 and its target mechanism as the gap changes. One embodiment of this indication is described with respect to FIGS. 4-6.

Proximity sensor interface device 300 is utilized to electronically rig proximity sensor 302 in lieu of the above described mechanical gauging. Electronic rigging of the sensor means that mechanical rigging of the proximity sensors with modified tooling is not needed. Electronic rigging is also more accurate than mechanical rigging, at least in certain proximity sensor applications, due to space constraints.

In embodiments, proximity sensor interface device 300 includes an integral power supply to drive itself as well as the proximity sensor 302 under test so proximity sensor interface device 300 is a stand-alone unit. As such, aircraft power is not needed to electronically rig the sensors as is done in certain applications.

Figure 4:
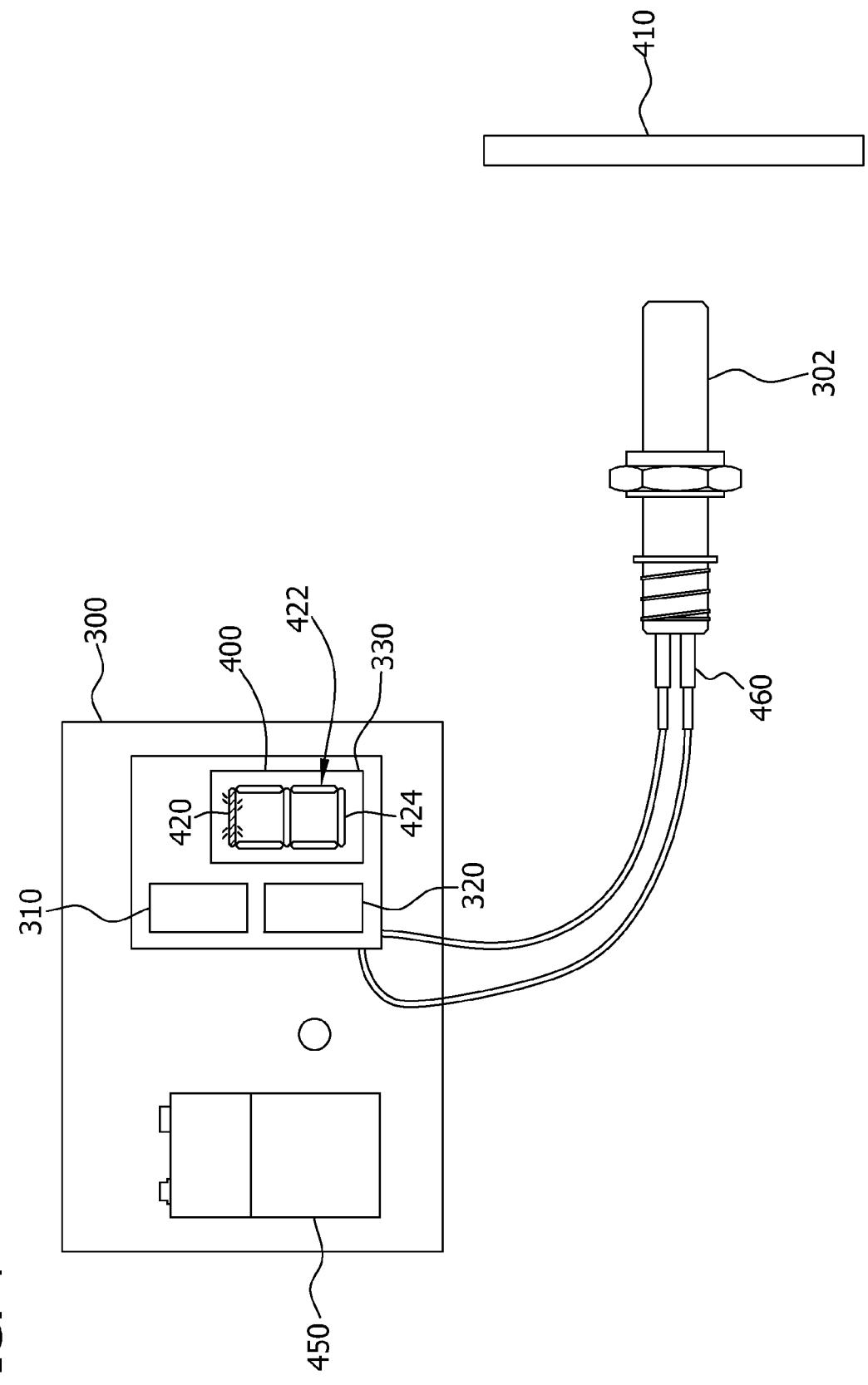
FIG. 4 illustrates an example display on the proximity sensor interface device of FIG. 3 when the proximity sensor is too far from its intended target.

FIG. 4 illustrates an example display 400 on the proximity sensor interface device 300 of FIG. 3 when the proximity sensor 302 is too far from its intended target 410. As seen in FIG. 4, only one "end segment" 420 of the common seven segment display 422 is illustrated as being illuminated, or flashing.

Figure 5:
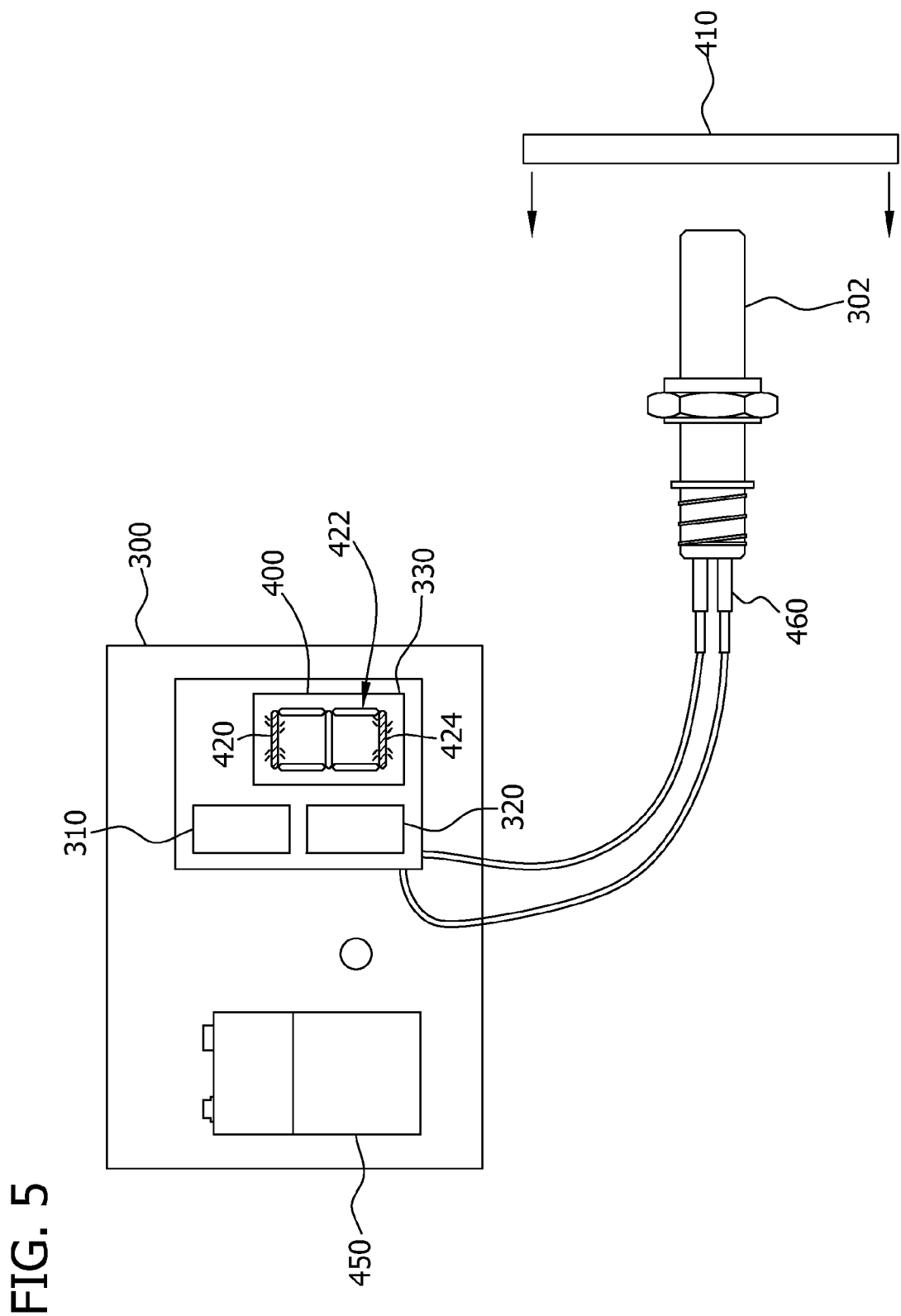
FIG. 5 illustrates an example display on the proximity sensor interface device of FIG. 3 when the proximity sensor is the correct (i.e. nominal) distance from its intended target.

FIG. 5 illustrates the example display 400 on the proximity sensor interface device 300 of FIG. 3 when the proximity sensor 302 is the correct (i.e. nominal) distance from its intended target 410. As seen in FIG. 5, two "end segments" 420 and 424 of the common seven segment display 422 are illustrated as being illuminated, or flashing.

Figure 6:
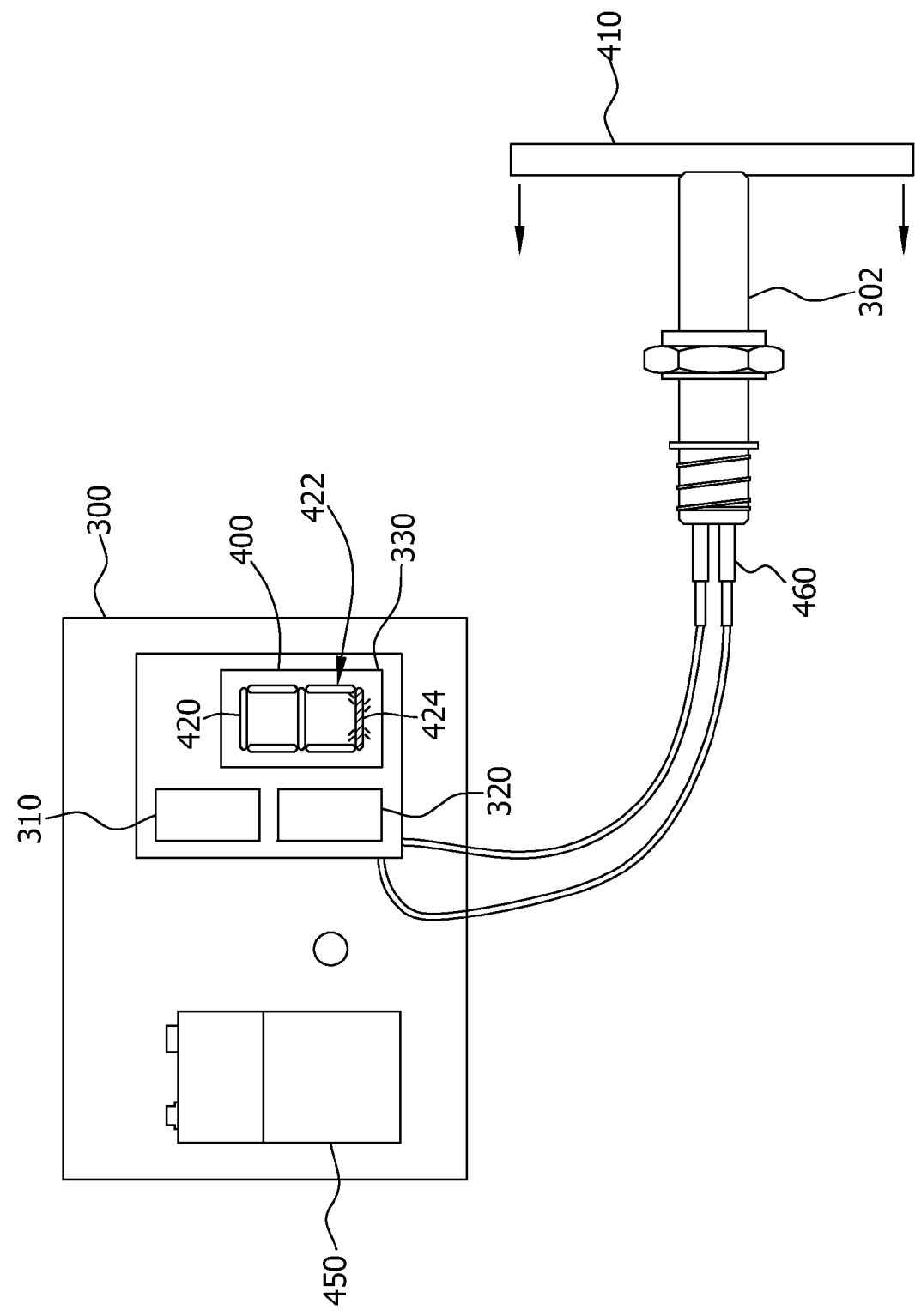
FIG. 6 illustrates an example display on the proximity sensor interface device of FIG. 3 when the proximity sensor is too close to its intended target.

FIG. 6 illustrates an example display 400 on the proximity sensor interface device 300 of FIG. 3 when the proximity sensor 302 is too close to its intended target 410. As seen in FIG. 6, only "end segment" 424 of the common seven segment display 422 is illustrated as being illuminated, or flashing. It is apparent that another type of display might be utilized on tool 300, for example, individual LEDs of the same (or different) colors.

For true portability, at least one embodiment of proximity sensor interface device 300 is intended to run completely stand-alone so a small display on the tool 300 (e.g., the seven segment display 422) indicates either target near, target nominal/indeterminate, or target far conditions. This indication can be further simplified to Sensor GO/NOGO for ease of use. In the aircraft pressure door application referred to herein, proximity sensor interface device 300 easily connects to the sensor 302 and the pressure door (e.g., the target mechanism for sensor 302 in one application) is moved back and forth to verify that the proximity sensors deployed on a pressure access door are properly rigged during door installation. Proximity sensor interface device 300 can be calibrated on a test rig which provides a known gap between proximity sensor 302 and a target to ensure proper operation and production readiness.

Referring to the pictorial view of proximity sensor interface device 300 shown in FIGS. 4-6, the major components include the processing device 310, such as a microcontroller also capable of embodying a frequency generator, the seven segment display 422 (illustrated as display 330 in FIG. 3), and a power supply (battery 450). Various embodiments are contemplated. For example, signals utilized to operate the display 330 may be routed to a computer or other type of device capable of providing a distinguishing display along the lines of that described with respect to FIGS. 4-6 and the seven segment display 422. Many visual indicator combinations can be utilized. Proximity sensor interface device 300 may also include a connector 460 which provides an easy connect/disconnect mechanism between the device 300 and a proximity sensor 302.

In summary, the proximity sensor interface device 300 described herein is a portable, hand-held, self-powered, proximity sensor rigging device that allows for electronic rigging of, for example, aircraft pressurized door sensors. The capability to electronically rig these sensors is in lieu of mechanical sensor rigging. The proximity sensor interface device 300 connects directly to a proximity sensor that is installed on an aircraft, for example, and is able to both drive and interrogate a proximity sensor.

When proximity sensor interface device 300 is connected to a proximity sensor 302, and a metal target is moved back and forth across the sensor face, a signal is generated that manifests itself as a quantifiable and repeatable output to a display or secondary processing device.

In one type of application, proximity sensor interface device 300 may be utilized by airlines and major overhaul facilities that service aircraft in the event that they need to install replacement sensors and subsequently rig them to specification. Cost savings through utilization of proximity sensor interface device 300 is found due to reduced time in the shop to install and rig the doors. Additional cost savings is achieved in that the door installation procedure can be completed earlier and in one job since no aircraft power is required to use proximity sensor interface device 300 when rigging the sensor.

In one embodiment, device 300 is calibrated using a single-axis motion table with a micrometer to set a known gap between the proximity sensor 302 and the target 410, for capturing the RC-decay output. These RC-decay values are then stored for that particular sensor/target configuration within processing device 320. Embodiments are contemplated where a processing device is configured to store RC-decay values for different proximity sensor/target combinations, the RC-decay values for each sensor/target configuration determined using similar calibrations steps. Certain embodiments of proximity sensor and targets may require a different RC circuit with different values for one or more of the resistor 396 and capacitor 398. As such, switching may be incorporated into device 300 to allow for testing with different RC combinations and/or testing with multiple RC-decay values stored within device 300.

The above defines a method for calibrating device 300. Specifically, a metal target is moved towards a face of a proximity sensor that is fixed in position until the target and sensor face establish contact, the metal target is then moved away from the face of the proximity sensor to a prescribed gap distance. Device 300 is then operated to obtain an output value, thereby defining a relationship between gap distance and the output value that can be tabulated within a look up table in the processing device. The steps can be repeated to generate additional gap distance to output values for storage within the look up table.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device for determining a position of a proximity sensor with respect to a target mechanism, said device comprising:
    a frequency generator;
    a processing device; and
    an RC circuit, an output of said frequency generator operable for application to a proximity sensor whose position relative to a target is to be verified, said RC circuit chargeable via voltage applied to the proximity sensor by said frequency generator, said processing device programmed to turn off the output of said frequency generator after a prescribed amount of time, and further programmed to measure a discharge time of said RC circuit after turning off the output of said frequency generator, the discharge time of the RC circuit being directly proportional to a perceived gap between a face of the proximity sensor and the target mechanism.

2. A device according to claim 1 further comprising a display, said programmable device configured to:
    cause said display to provide a first indication when the discharge time is indicative of the face of the proximity sensor being too far from the target mechanism;
    cause said display to provide a second indication, different from the first indication, when the discharge time is indicative of the face of the proximity sensor being too close to the target mechanism; and
    cause said display to provide a third indication, different from the first indication and the second indication, when the discharge time is indicative of the face of the proximity sensor being in a nominally correct position with respect to the target mechanism.

3. A device according to claim 2 further comprising a battery electrically coupled to said processing device, said frequency generator, and said display.

4. A device according to claim 1 packaged as a hand held unit.

5. A device according to claim 1 wherein said processing device comprises said frequency generator.

6. A device according to claim 1 wherein said processing device is programmed to repeatedly cycle the frequency generator with a first prescribed time for causing said frequency generator to output a signal of known frequency and a second prescribed time for not outputting a signal of known frequency, the second prescribed time further allowing for discharge of said RC circuit.

7. A method for determining a position of a proximity sensor with respect to a target mechanism, said method comprising:
    applying a signal of known frequency to the proximity sensor;
    charging an RC circuit with the signal passing through the proximity sensor;
    removing the signal of known frequency from the proximity sensor after a prescribed time period; and
    measuring the discharge time of the RC circuit, the discharge time being directly proportional to a perceived gap between a sensor face of the proximity sensor and the target mechanism.

8. A method according to claim 7 further comprising:
    providing a first indication when the measured discharge time is indicative of a face of the proximity sensor being too far from the target mechanism;
    providing a second indication, different from the first indication, when the measured discharge time is indicative of a face of the proximity sensor being too close to the target mechanism; and
    providing a third indication, different from the first and the second indications, when the measured discharge time is indicative of a face of the proximity sensor being in a nominally correct position with respect to the target mechanism.

9. A method according to claim 7 further comprising repeatedly applying the signal of known frequency for a first prescribed time and repeatedly removing the signal of known frequency for a second prescribed time, the second prescribed time allowing for the discharge time of the RC circuit.

10. A unit for determining a position of a proximity sensor with respect to a target mechanism, said unit comprising:
    a processing device programmed to output a signal of known frequency for a first prescribed period of time, the signal being used for application to the proximity sensor; and
    an RC circuit operatively coupled to the proximity sensor and the processing device, said RC circuit charged by the signal of known frequency passing through the proximity sensor, said processing device programmed to measure a discharge time of said RC circuit after the signal of known frequency is removed from the proximity sensor, the discharge time being directly proportional to a perceived gap between a sensor face of the proximity sensor and the target mechanism.

11. A unit according to claim 10 further comprising an indicator communicatively coupled to said processing device, said processing device programmed to cause said indicator to provide a plurality of indications, each indication related to a discharge time of said RC circuit.

12. A unit according to claim 11 wherein said indicator comprises a display, said processing device programmed to:
    cause said display to provide a first indication when the discharge time of said RC circuit is indicative of the face of the proximity sensor being too far from the target mechanism;
    cause said display to provide a second indication, different from the first indication, when the discharge time is indicative of the face of the proximity sensor being too close to the target mechanism; and cause said display to provide a third indication, different from the first indication and the second indication, when the discharge time is indicative of the face of the proximity sensor being in a nominally correct position with respect to the target mechanism.

13. A unit according to claim 11 further comprising a battery electrically coupled to said processing device, said frequency generator, and said indicator.

14. A unit according to claim 13 packaged as a hand held unit.

15. A unit according to claim 10 wherein to measure a discharge time of said RC circuit after the signal of known frequency is removed, said processing device is programmed with second prescribed time for not outputting a signal of known frequency.

16. A unit according to claim 15 wherein said processing device is programmed to repeatedly cycle the first prescribed time, causing said processing device to output a signal of known frequency, and the second prescribed time, causing said processing device to not output a signal of known frequency, the second prescribed time further allowing for discharge of said RC circuit and measurement of this discharge time.

17. A unit according to claim 16 further comprising an indicator communicatively coupled to said processing device, said processing device programmed to cause said indicator to provide an indication related to the discharge time of said RC circuit, each indication occurring within a cycle of the first prescribed time and the second prescribed time.

18. A unit according to claim 10 wherein said processing device is programmed with a lookup table, said lookup table comprising data correlating a discharge time of said RC circuit with a distance between the proximity sensor and the target device.

19. A method for calibrating the unit of claim 10 said method comprising:

moving a metal target towards a face of a proximity sensor that is fixed in position until the target and sensor face establish contact;

moving the metal target away from the face of the proximity sensor to a prescribed gap distance;

operating said unit to obtain an output value;

tabulating a relationship between gap distance and the output value within a look up table; and repeating to generate additional gap distance to output values within the look up table.

* * * * *